United States Patent [19]
Kato et al.

[11] Patent Number: 4,653,346
[45] Date of Patent: Mar. 31, 1987

[54] TRANSMISSION FOR USE IN MOTOR VEHICLE

[75] Inventors: Shogo Kato; Jun Takase; Masanori Okada, all of Toyota; Kouziro Kuramochi, Okazaki, all of Japan

[73] Assignee: Toyota Jidosha Kabushiki Kaisha, Toyota, Japan

[21] Appl. No.: 644,235

[22] Filed: Aug. 27, 1984

[51] Int. Cl.[4] .................. F16H 37/08; F16H 57/00
[52] U.S. Cl. ..................... 74/701; 74/410; 74/695
[58] Field of Search ............... 74/694, 695, 700, 701, 74/410

[56] References Cited

U.S. PATENT DOCUMENTS

| | | |
|---|---|---|
| 2,867,126 | 1/1959 | Bolster .................. 74/700 X |
| 3,885,446 | 5/1975 | Pengilly ................. 74/410 X |
| 4,280,374 | 7/1981 | Kubo et al. ............. 74/695 |
| 4,528,870 | 7/1985 | van Deursen et al. ..... 74/701 |

FOREIGN PATENT DOCUMENTS

| | | | |
|---|---|---|---|
| 933246 | 9/1955 | Fed. Rep. of Germany | 74/701 |
| 2803840 | 3/1979 | Fed. Rep. of Germany | 74/701 |
| 499000 | 11/1919 | France | 74/701 |
| 0184741 | 11/1982 | Japan | 74/410 |
| 10347 | of 1911 | United Kingdom | 74/701 |
| 931877 | 7/1963 | United Kingdom | 74/701 |

Primary Examiner—Leslie Brown
Assistant Examiner—Dirk Wright
Attorney, Agent, or Firm—Oblon, Fisher, Spivak, McClelland & Maier

[57] ABSTRACT

In a transmission for use in a motor vehicle is provided a transmission shaft having driven and driving gears on opposite ends thereof. Engine power is fed to the transmission shaft via the driven gear and then transmitted from the shaft to a final reduction-gear assembly via the driving gear. The transmission shaft is supported by first and second bearings radially and axially, respectively.

4 Claims, 4 Drawing Figures

FIG. 2

| SPEED CHANGE POSITION | 32 | 34 | 36 | 38 | 40 | 42 | 44 | 48 | 50 | 52 |
|---|---|---|---|---|---|---|---|---|---|---|
| FIRST SPEED | ○ |  |  |  |  | △ | ⊙ | ⊙ | △ |  |
| SECOND SPEED | ○ |  | ○ | △ | ○ |  |  | ⊙ | △ |  |
| THIRD SPEED | ○ | ○ |  |  |  |  |  | ⊙ | △ |  |
| OVERDRIVE | ○ | ○ |  |  |  |  |  |  |  | ○ |
| REVERSE |  | ○ |  |  |  |  | ○ | ○ | △ |  |

TRANSMISSION FOR USE IN MOTOR VEHICLE

BACKGROUND OF THE INVENTION

1. Field of the Invention

The present invention relates to a transmission for use in a motor vehicle and more particularly to a support structure for a transmission shaft of the transmission.

2. Description of the Prior Art

In a FF (front engine front drive) motor vehicle, an engine is positioned laterally of the motor vehicle while a transmission shaft is provided to reduce the axial dimension of the transmission. The transmission shaft has on one end a driven gear meshing with an output gear of an auxiliary speed change gear assembly as an automatic transmission and on the other end a driving gear meshing with a driven gear of a final reduction-gear assembly disposed approximately central position in the transverse direction of the motor vehicle. In prior transmissions, the transmission shaft is supported both axially and radially by taper roller bearings, and sufficient corrective measures to prevent noises related to the support of the transmission shaft were not taken. Namely, the axial vibration of the transmission shaft was large and the sound produced by engagement of the output gear of the auxiliary speed change gear assembly with the driven gear of the transmission shaft was large.

SUMMARY OF THE INVENTION

An object of the present invention is to provide a transmission for use in a motor vehicle in which the support of a transmission shaft is improved to reduce noises.

According to the present invention to achieve this object, in the transmission for use in the motor vehicle provided with the transmission shaft mounting on both ends respectively a driven gear for receiving power from an engine and a driving gear for driving a driven gear of a final reduction-gear assembly, are provided a first bearing for supporting radially the transmission shaft and a second bearing disposed separately from the first bearing to support axially the transmission shaft.

Since the second bearing for supporting axially the transmission shaft is provided separately from the first bearing, the play in the transmission shaft is sufficiently absorbed so that the meshing sound and axial vibration causing noises are to be restrained. The sufficient restraining effect of the present invention on the meshing sound and axial vibration was actually proved by experiments which will be later described.

In a preferred embodiment of the present invention, the second bearing is a thrust needle bearing provided between a housing portion for covering the driven gear side end of the transmission shaft and a flange portion of the transmission shaft, and the first bearing is a radial roller bearing or radial ball bearing.

While this transmission shaft is applied to the transmission suited for a FF motor vehicle for example, the transmission shaft in such transmission extends parallel to the center axis of auxiliary speed change gear assembly and an axle shaft, and the driven gear of the transmission shaft meshes with the output gear of the auxiliary speed change gear assembly.

Also the taper roller bearing in the prior transmission may be left as the first bearing and the thurst bearing may be added as the second bearing.

The accompanying drawings, which are incorporated in and constitute a part of this specification, illustrate an embodiment of the present invention and, together with the description, serve to explain the principles of the present invention.

BRIEF DESCRIPTION OF THE DRAWINGS

FIG. 2 is a table showing the engaging condition of a frictional engagement unit in each speed change position;

DESCRIPTION OF THE PREFERRED EMBODIMENT

Figure 1:
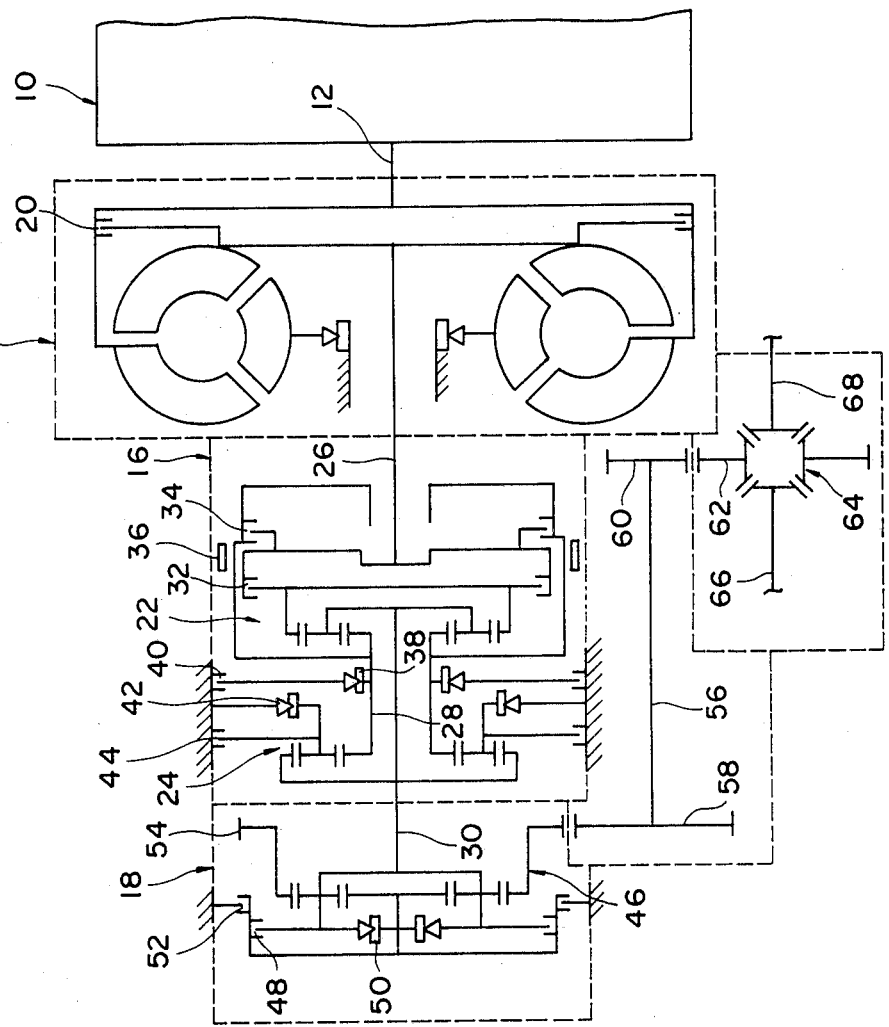
FIG. 1 is a skeleton drawing of the whole transmission.
Figure 3:
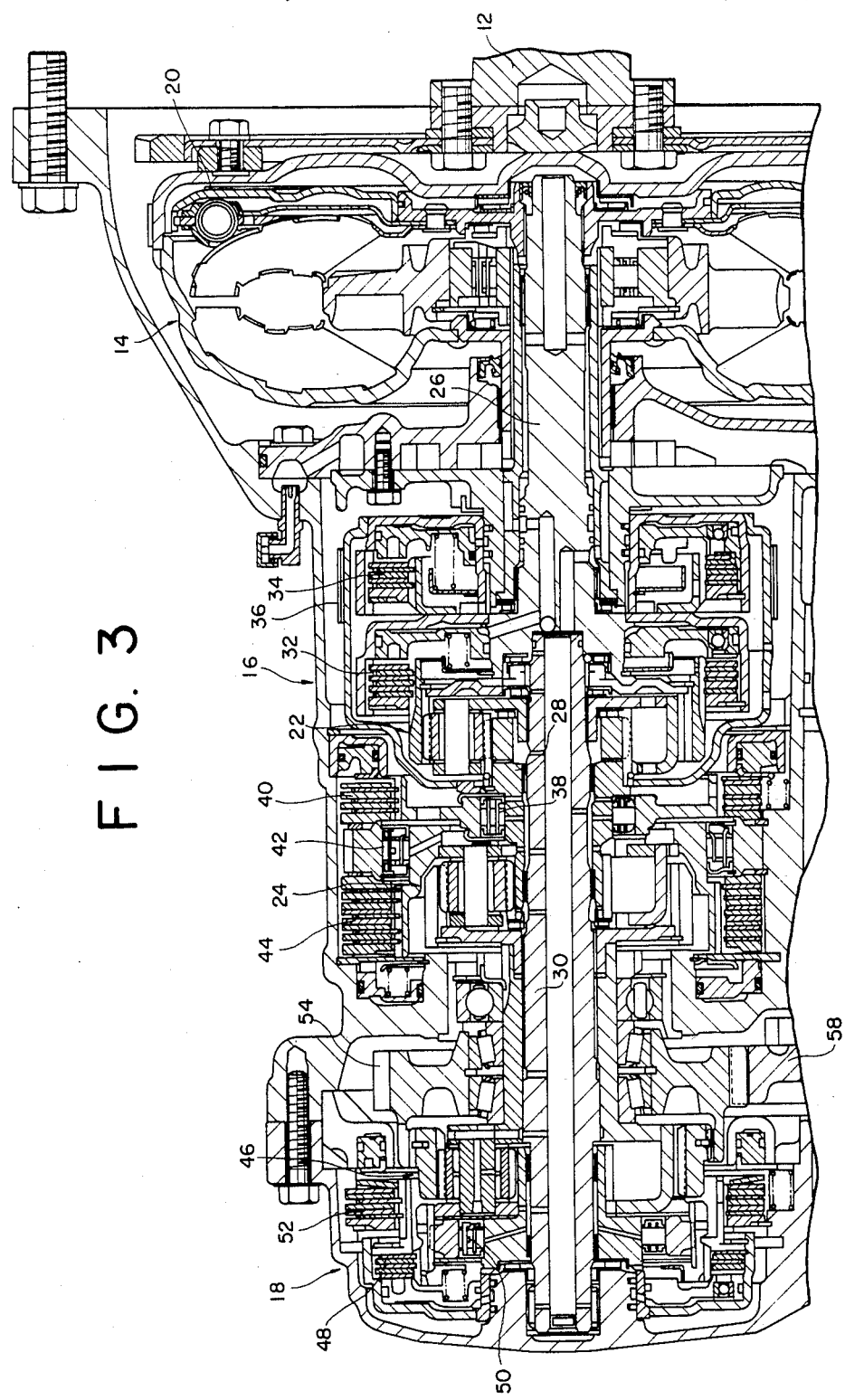
FIG. 3 is a detail view showing an auxiliary speed change gear assembly.

In FIGS. 1 and 3, an engine 10 is positioned transversely of a motor vehicle, i.e. a crankshaft 12 extends transversely of the motor vehicle, and sequentially from the proximity of the engine 10 are arranged a hydraulic torque converter 14, an underdrive unit 16 and an overdrive unit 18 coaxially with the crankshaft 12. A lock-up clutch 20 is provided in parallel to the hydraulic torque converter 14. The underdrive unit 16 has planetary gear units 22,24, an input shaft 26 connected to the hydraulic torque converter 14, an intermediate shaft 28 and an output shaft 30. A clutch 32 controls the connection of the input shaft 26 with a ring gear of the planetary gear unit 22, and a clutch 34 controls the connection of the input shaft 26 with the intermediate shaft 28, and a brake band 36 controls the fixation of the intermediate shaft 28. A sun gear of planetary gear units 22,24 is fixed to the intermediate shaft 28, and an one-way clutch 38 and a brake 40 are interconnected in series to control the fixation of the intermediate shaft 28. A one-way clutch 42 and a brake 44 are interconnected in parallel to control the fixation of a carrier of the planetary gear unit 24. The overdrive unit 18 comprises a planetary gear unit 46, and the output shaft 30 is connected to a carrier of the planetary gear unit 46. A clutch 48 and an one-way clutch 50 control the connection of the sun gear of the planetary gear unit 46 and the carrier, and a brake 52 controls the fixation of the sun gear while an output gear 54 is fixed to a ring gear.

A transmission shaft 56 extends parallel to the input shaft 26 and the output shaft 30 and has on both ends a driven gear 58 and a driving gear 60 respectively. The driven gear 58 meshes with the output gear 54 and the driving gear 60 with a driven gear 62 of the final reduction-gear assembly. Axle shafts 66,68 extend parallel to the transmission shaft 56 from a differential unit 64.

In FIG. 2, numerals correspond to the respective frictional engaging units in FIG. 1, ○ representing said unit put into the engaging condition by hydraulic control, △ representing the one-way clutch under the engaging condition and ◎ representing said units put into the engaging condition by the hydraulic control unit to operate an engine brake respectively.

Figure 4:
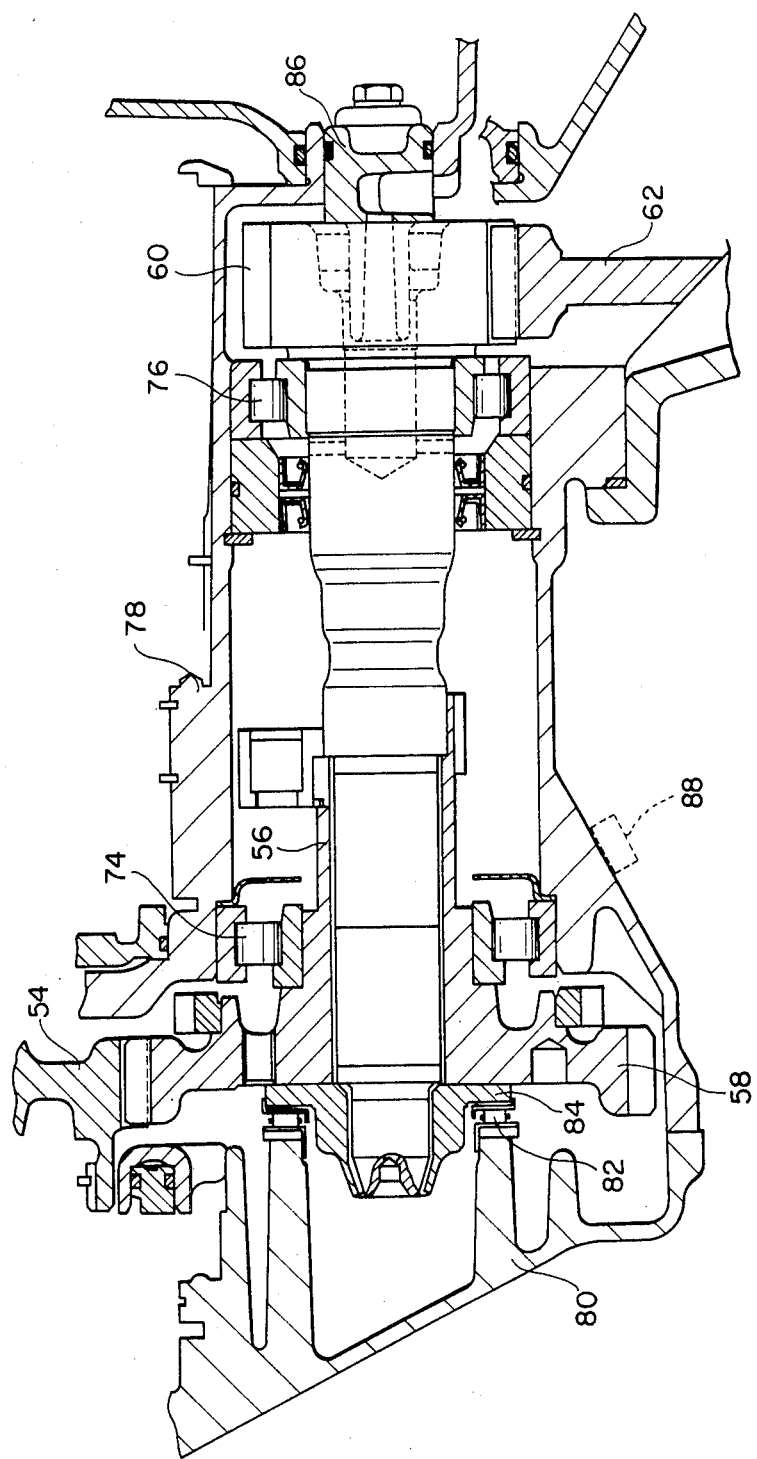
FIG. 4 is a detail view showing a support structure of a transmission shaft.

FIG. 4 shows the details of a structure for supporting the transmission shaft 56. The transmission shaft 56 is at both ends supported radially by roller bearings 74,76 respectively on a housing 78. Another housing 80 covers the driven gear 58 side end of the transmission shaft 56 and a thrust needle bearing 82 is provided between the housing 80 and a flange portion 84 of the transmission shaft 56 to support axially the transmission shaft 56.

A plug 86 is threaded into the housing at the driving gear 60 side of the transmission shaft 56. The plug 86 is formed in the inside with an oil path for conducting lubricating oil and projects into a hole in an end of the transmission shaft 56, while a predetermined gap is ensured between the transmission shaft 56 and the plug 86 so that the transmission shaft 56 is smoothly rotated. The teeth of the output gear 54 and the driven gear 58 are bevelled so that a thrust force toward the plug 86 is exerted on the transmission shaft 56 by the engagement of both gears, and the teeth of the driving gear 60 and the driven gear 62 are bevelled so that the thrust force toward the housing 80 is exerted on the transmission shaft 56 by the engagement of both gears. Since the number of teeth of the driving gear 60 is smaller than that of the driven gear 58, the thrust force toward the housing 80 is larger than that toward the plug 86 so that a support for the thrust of the transmission shaft 56 at the driving gear 60 side end is to be omitted.

Since the radial and axial support for the transmission shaft 56 is thus shared respectively by roller bearings 74,76 and the thrust needle bearing 82, play in the transmission shaft 56 is sufficiently removed to reduce the engaging sound of the output gear 54 and the driven gear 58 and the axial vibration of the transmission shaft 56 and restrain noises.

Further, while the thrust needle bearing 82 is used for a thrust bearing and the roller bearings 74,76 are used for radial bearings in the embodiment, other thrust bearings like thrust ball bearings and other radial bearings like radial ball bearings or radial needle bearings may be course be used.

It will be apparent to those skilled in the art that various modifications and variations could be made in the transmission of the invention without departing from the scope or spirit of the present invention.

What is claimed as new and desired to be secured by Letters Patent of the United States is:

1. A transmission for use in a motor vehicle, said transmission including a transmission shaft on both ends of which are mounted respectively a first driven gear for receiving power from an engine and a driving gear for driving a second driven gear of a final reduction gear assembly, comprising:
    a first bearing arranged at a first side of said first driven gear for supporting radially the transmission shaft; and
    a second bearing arranged at a second side of said driven gear opposite said first side and provided separately from the first bearing and supporting the transmission shaft axially wherein said second bearing further comprises a thrust needle bearing provided between a housing portion for covering an end of said first driven gear on the transmission shaft and a flange portion of said transmission shaft and wherein said first bearing further comprises a first radial roller bearing.

2. A transmission for use in a motor vehicle as defined in claim 1, further comprising an axle shaft and an auxiliary speed change gear assembly wherein the transmission shaft extends parallel to a center axis of said auxiliary speed change gear assembly and said axle shaft.

3. A transmission for use in a motor vehicle as defined in claim 2, wherein said auxiliary speed change gear assembly includes an output gear and the driven gear of the transmission shaft meshes with said output gear of auxiliary speed change gear assembly.

4. A transmission for use in a motor vehicle as defined in claim 1, wherein the second bearing further comprises a thrust bearing.

* * * * *